United States Patent
Miller (12)

(10) Patent No.: US 6,484,888 B2
(45) Date of Patent: *Nov. 26, 2002

(54) APPARATUS AND METHOD FOR STORING A BICYCLE OR OTHER TWO-WHEELED VEHICLE USING A SUSPENSION MOUNT SUSPENDED FROM A SUPPORT STRUCTURE

(76) Inventor: Jay R. Miller, 1140 S. Orlando Ave., #K14, Maitland, FL (US) 32751

( * ) Notice: Subject to any disclaimer, the term of this patent is extended or adjusted under 35 U.S.C. 154(b) by 0 days.

This patent is subject to a terminal disclaimer.

(21) Appl. No.: 09/770,147

(22) Filed: Jan. 26, 2001

(65) Prior Publication Data

US 2002/0038844 A1 Apr. 4, 2002

Related U.S. Application Data

(63) Continuation-in-part of application No. 09/677,252, filed on Oct. 2, 2000.

(51) Int. Cl.⁷ .......................... E05B 73/00; F16M 13/00
(52) U.S. Cl. .......................... 211/5; 248/551; 248/303; D8/370; D8/373
(58) Field of Search .............................. 211/5; 248/551, 248/552, 303, 304, 302, 333, 323, 331, 495; D8/370, 372, 373, 367; 408/3, 292; 24/369, 370, 907; 411/389, 384, 383, 178

(56) References Cited

U.S. PATENT DOCUMENTS

| | | | | |
|---|---|---|---|---|
| 32,824 A | * | 7/1861 | Schleicher .................. 137/170 |
| 525,752 A | * | 9/1894 | Tower .......................... 248/303 |
| 606,118 A | | 6/1898 | Bowman ........................ 211/5 |
| 927,483 A | * | 7/1909 | Bradley ....................... 248/303 |
| 1,202,444 A | | 10/1916 | Soleau ........................... 211/4 |
| 3,092,412 A | * | 6/1963 | Drake .......................... 24/370 |
| 3,828,936 A | | 8/1974 | Hoening ....................... 211/19 |
| 3,970,197 A | | 7/1976 | Bale, Jr. ........................ 211/5 |
| 4,025,014 A | * | 5/1977 | Larson ....................... 248/552 |
| 4,126,228 A | | 11/1978 | Bala et al. ..................... 211/5 |
| 5,074,419 A | * | 12/1991 | Smith .......................... 211/17 |
| 5,292,009 A | | 3/1994 | Smith ........................... 21/20 |
| 5,553,715 A | | 9/1996 | Brotz ............................ 211/5 |
| 5,702,007 A | | 12/1997 | Fritz et al. .................... 211/17 |
| 5,743,411 A | | 4/1998 | Hawkes ........................ 211/20 |
| 5,765,801 A | * | 6/1998 | Geiselman .................. 248/552 |
| 5,887,461 A | | 3/1999 | Heffley .......................... 70/18 |
| 6,036,153 A | * | 3/2000 | Rose et al. ............. 248/303 X |

* cited by examiner

Primary Examiner—Daniel P. Stodola
Assistant Examiner—Erica B. Harris
(74) Attorney, Agent, or Firm—Bracewell & Patterson, LLP

(57) ABSTRACT

A bicycle suspension mount has a fastener for attaching the mount to a preexisting structure and at least one extension defining a bicycle support extension. The bicycle support extension, moreover, threads through the spokes of a tire and provides for mounting of the bicycle that obviates need for having to precisely align part of the bicycle within or over the device for proper placement upon the suspension mount. A lock-loop is preferably provided on some embodiments of the suspension mount for locking the frame of the bicycle to the suspension mount for securely storing it in place following placement upon the suspension mount.

34 Claims, 11 Drawing Sheets

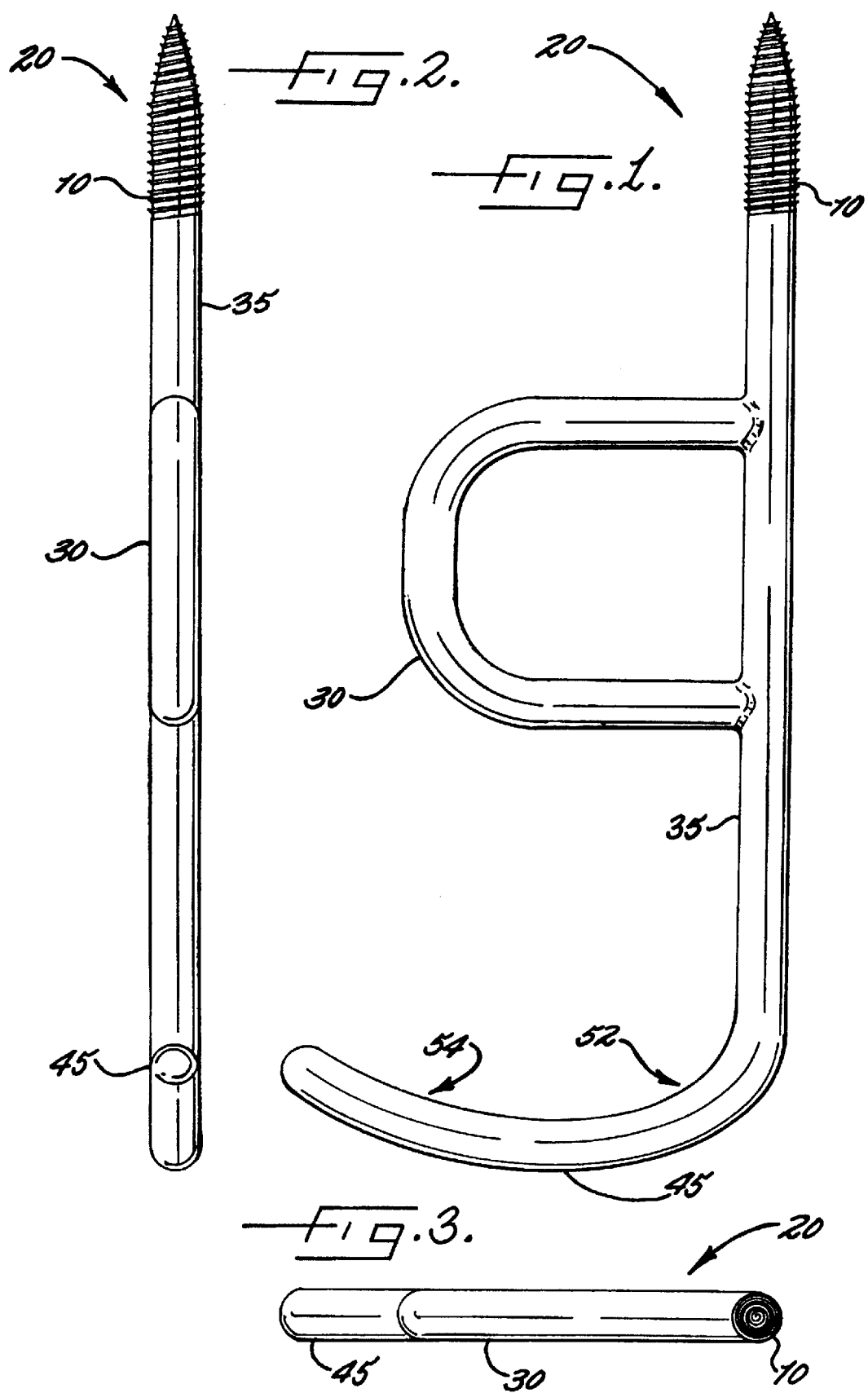

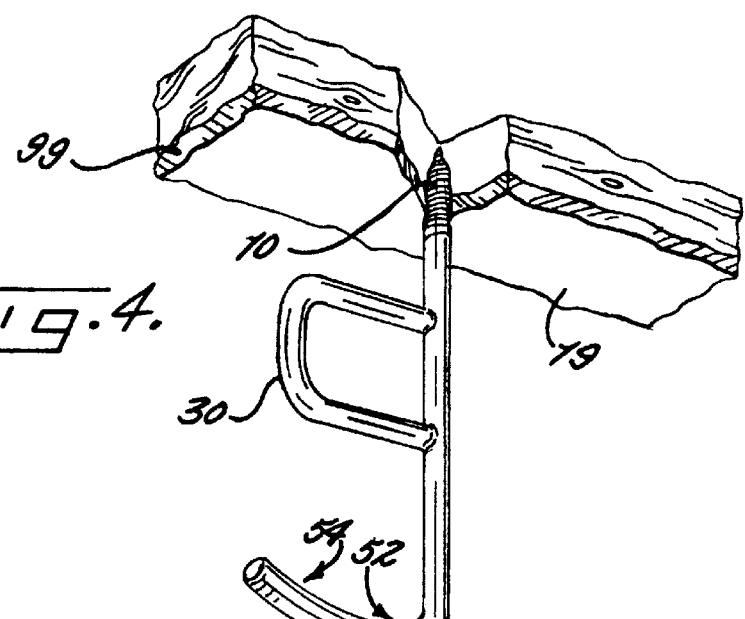
Fig. 4.
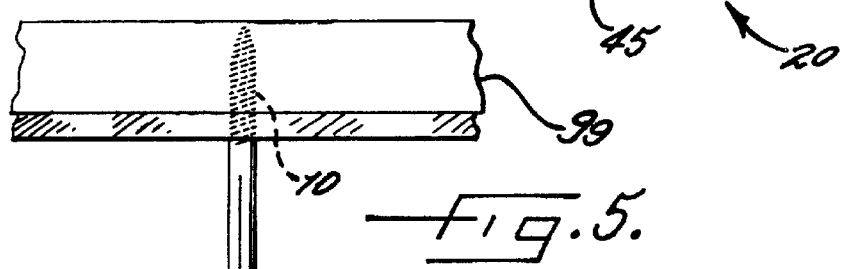
Fig. 5.
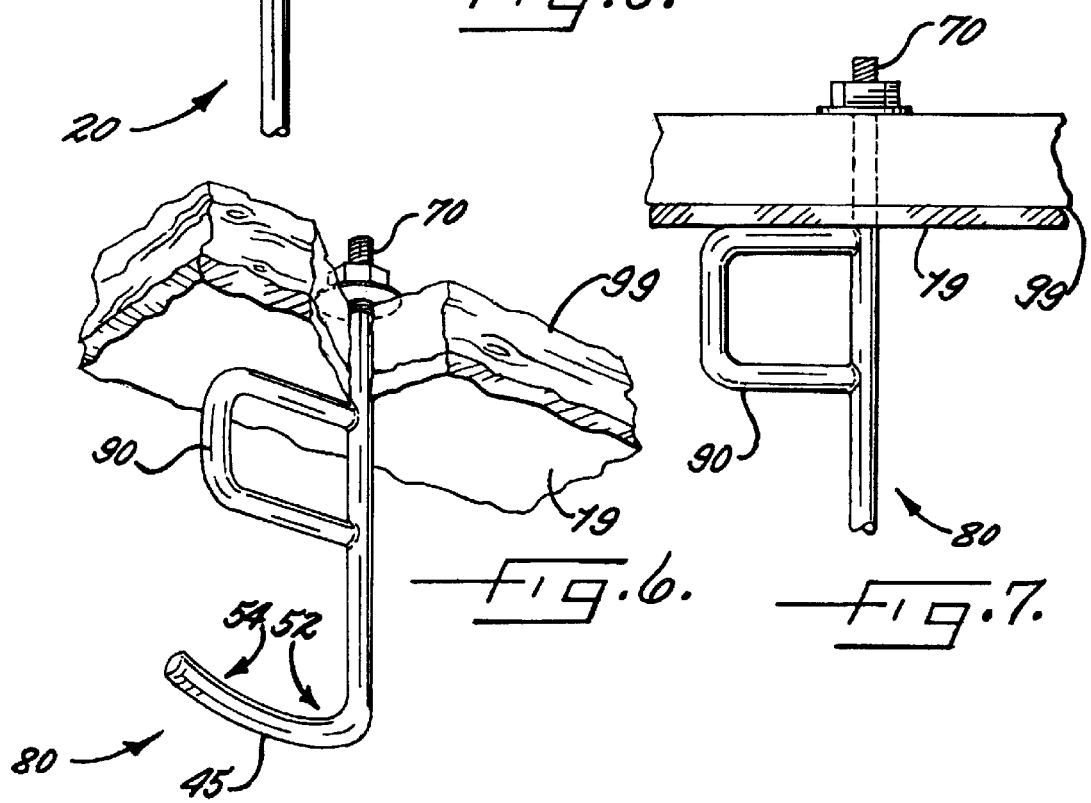
Fig. 6.
Fig. 7.

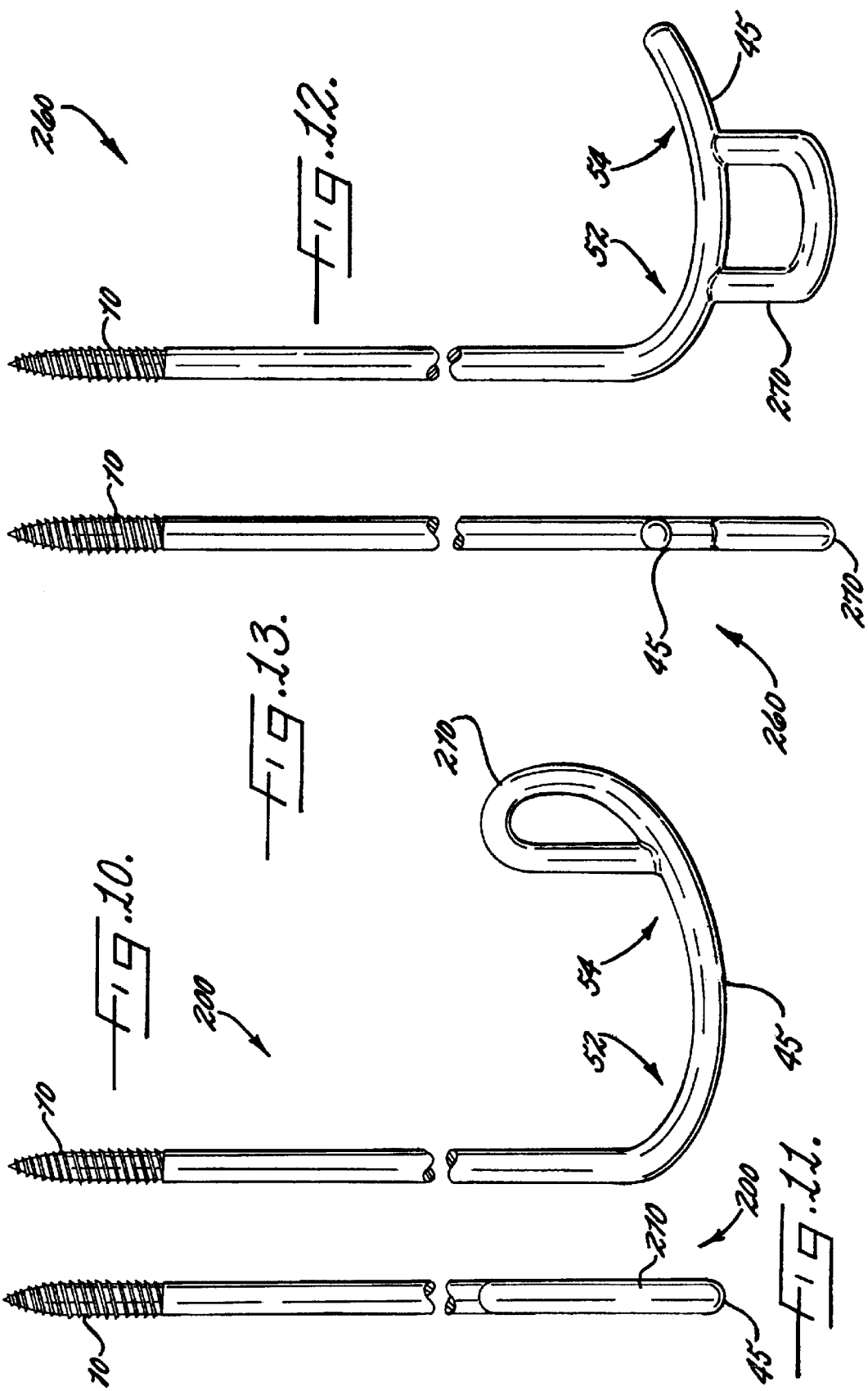

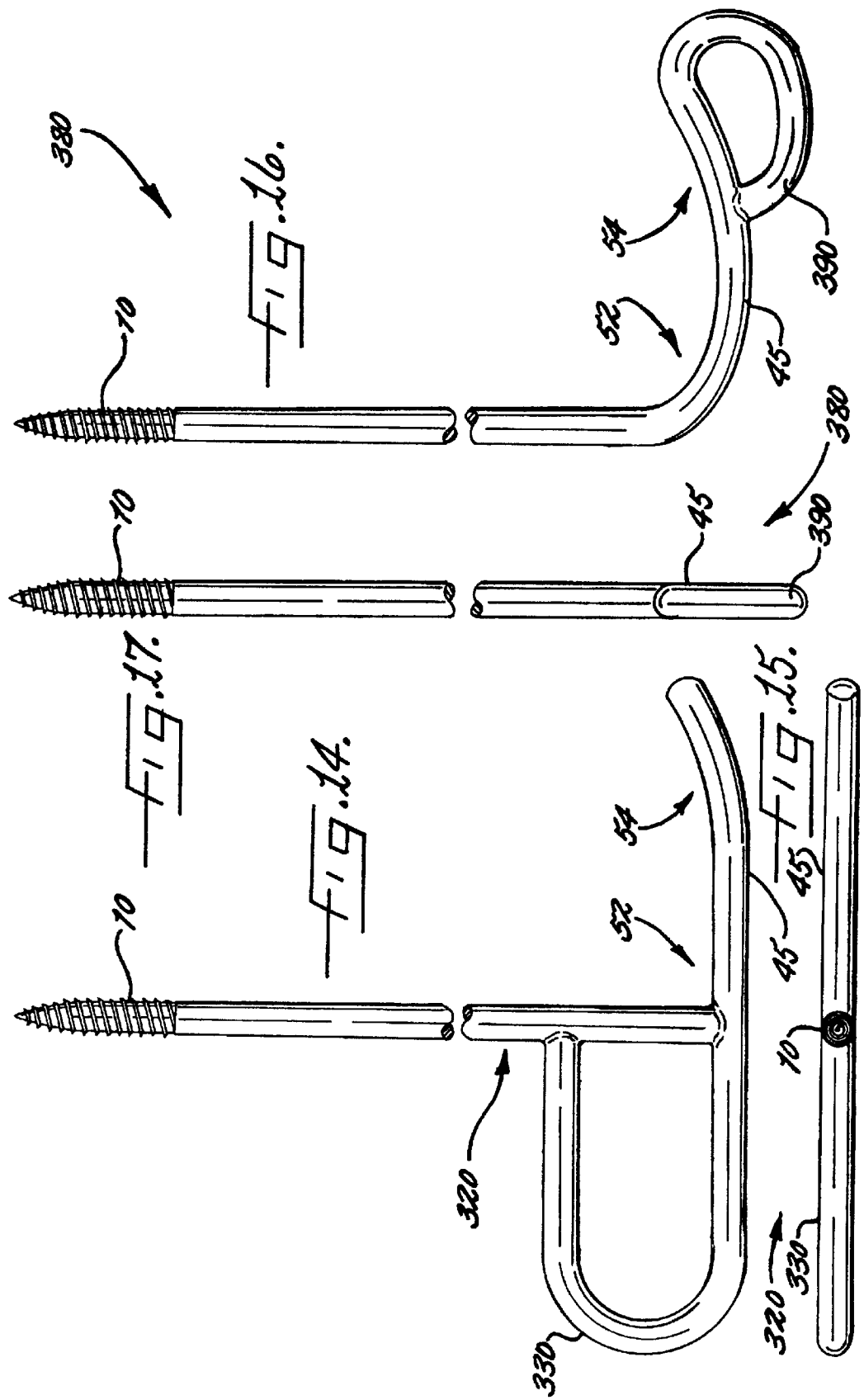

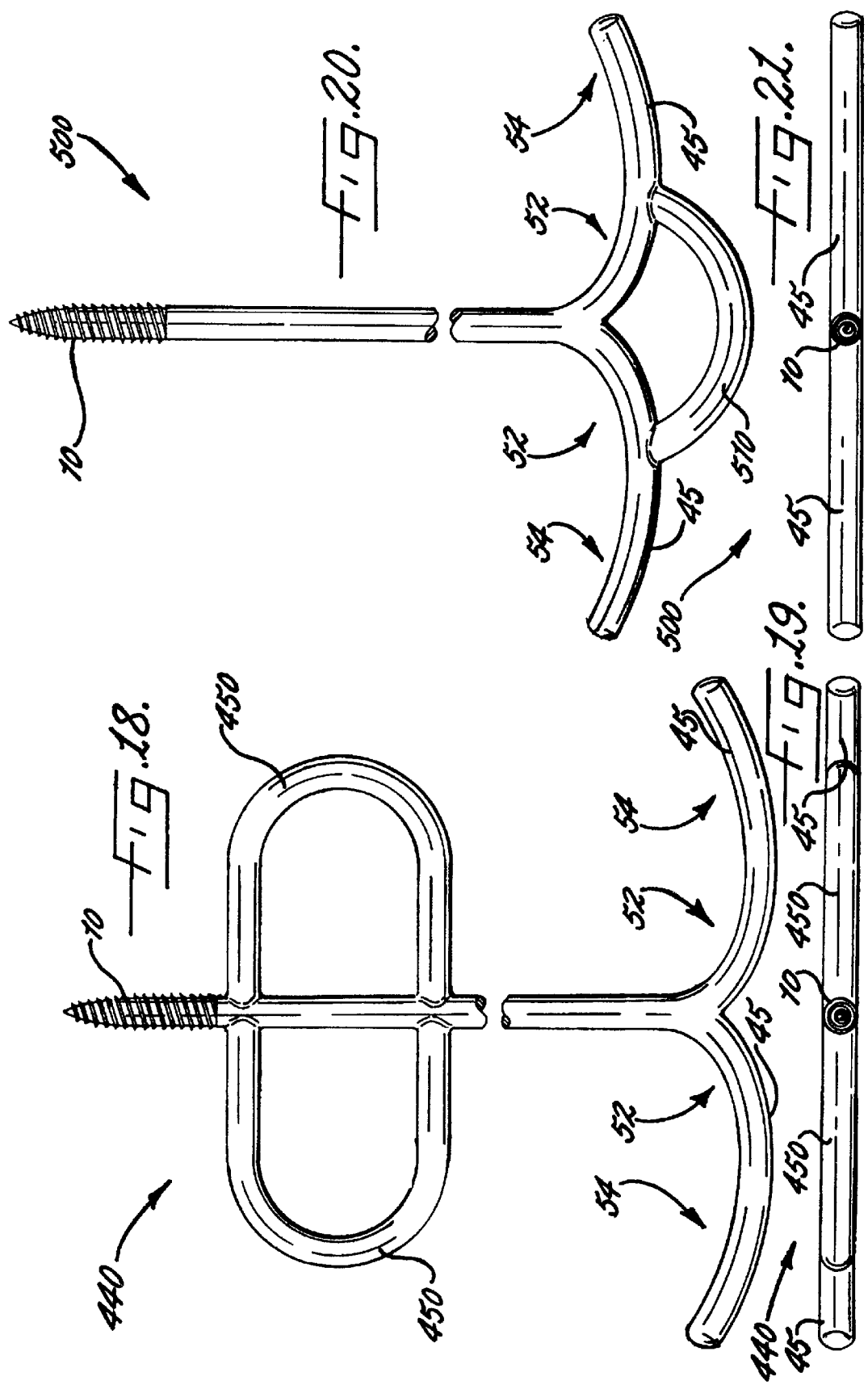

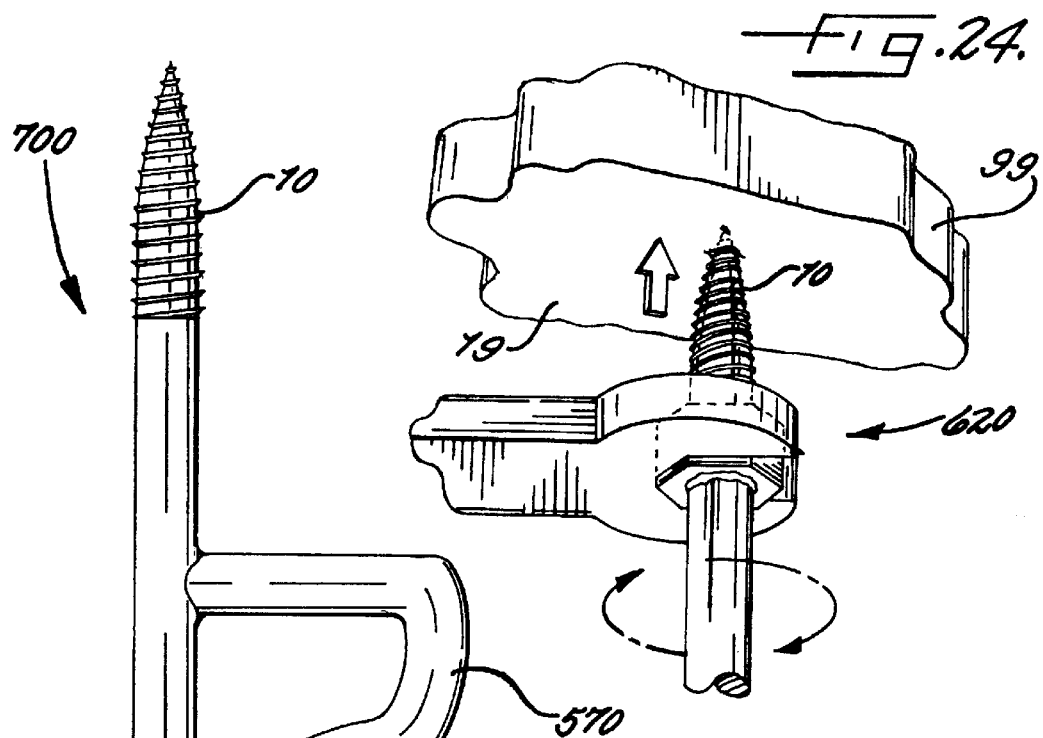
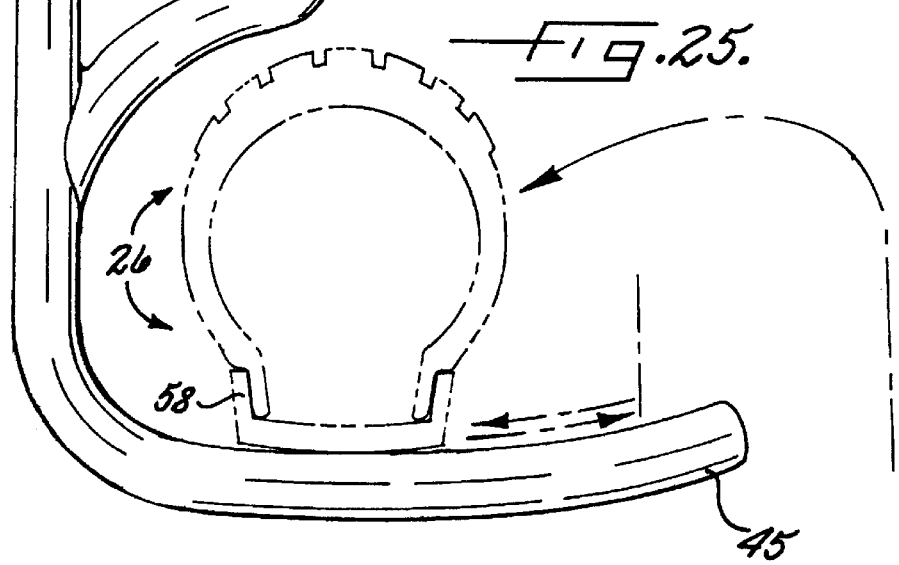
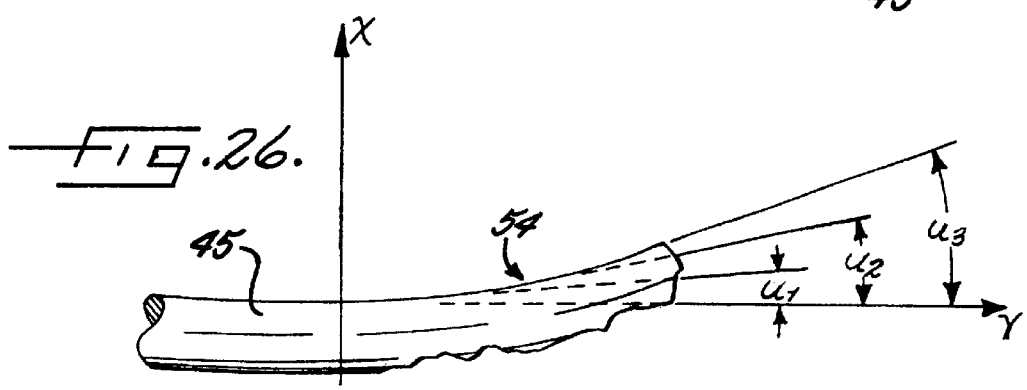

APPARATUS AND METHOD FOR STORING A BICYCLE OR OTHER TWO-WHEELED VEHICLE USING A SUSPENSION MOUNT SUSPENDED FROM A SUPPORT STRUCTURE

RELATED APPLICATIONS

This application is a continuation-in-part of U.S. patent application Ser. No. 09/677,252 filed Oct. 2, 2000, the disclosure of which is hereby incorporated by reference in its entirety.

FIELD OF THE INVENTION

The present invention relates to the field of storing a bicycle or other two-wheeled vehicle and, more particularly, to conveniently and securely storing such vehicles in a manner that permits their easy positioning for storage and easy removal for use while also providing a deterrence to theft of the bicycle or other two-wheeled vehicle.

BACKGROUND OF THE INVENTION

The bicycle remains an extraordinary useful and important device around the world despite its relative mechanical simplicity. Notwithstanding the undeniable dominance of the automobile as a mode of transportation on American highways, the bicycle continues to provide transportation, entertainment, and exercise for millions of Americans. In many other countries, the bicycle continues to be the primary source of affordable transportation, and in a world growing ever more concerned about the detrimental effect of the automobile on the environment, the bicycle along with public transportation is seen as a socially valuable alternative to the automobile. Moreover, the bicycle is a valuable exercise tool for increasingly health conscious American adults. And, of course, for the foreseeable future, the bicycle will remain a ubiquitous feature of childhood for millions of America's youth.

One persistent problem regarding bicycles, however, concerns their temporary storage. If one desires to use a bicycle frequently, then the bicycle cannot be packed away conveniently in permanent storage, and yet, it can be quite inconvenient simply to prop the bicycle against a wall in cramped garage or in a limited-space apartment or office. In addition to posing temporary storage problems, bicycles also continue to be easy targets for theft. According to national crime statistics, an estimated 5.6 million bicycles are stolen every year (source: NBC Dateline, Sep. 30, 1997). Indeed, the resale market for stolen bicycles is a billion dollar-a-year industry, according to these same statistics. The same risk pertains to many useful devices found in the garage of the average American home, including other lightweight vehicles, such as mopeds and scooters. Such devices, 30 like the bicycle, are valuable because they are relatively compact and mobile, but this is also what makes such devices so vulnerable to a would-be thief going past an open door to a garage where these devices are invariably stored.

Over the years, a number of bicycle storing devices have been proposed in an attempt to provide convenient storage and theft deterrence for a bicycle. For example, U.S. Pat. No. 3,828,936, issued to Hoenig and titled Bicycle Hanger, describes a vertical, wall-mountable device for holding a two-wheeled bicycle in a vertical position with one bicycle tire held on a narrow hook at the top of the device and the second tire resting within a near-floor level loop along with a third loop on the device to hold a lock and chain. U.S. Pat. No. 5,887,461, issued to Heffley and titled Bicycle Locking Device, describes a device mounted to a wall or other surface and having at its base a support arm attached to a locking arm, both of which can pivot upwardly or remain locked in place in a horizontal position. At the end of the locking arm, a "jaw-like" fastener capable of holding a bicycle crossbar is attached.

The Hoenig device requires a plurality of spaced-apart connections in order to hold an extended curved section flatly against a wall surface along with a back tire loop necessary to provide "vertical stability" to a mounted bicycle hung by its first wheel on a narrow hook; the loop holds the back tire of the bicycle to prevent movement that would cause the front tire to disengage from the narrow hook.

Considerable effort is required for positioning a bicycle so as to mount it for storage using a narrow Hoenig-style hook. In order to position the bicycle tire within the hook, one has to thread the tire over the hook and lift the bicycle frame up high enough so that the portion of the tire rim that is to be positioned within the hook is well above the hook. Having threaded the tire over the hook and lifted up the frame so that the portion of the tire rim that is to be placed within is held above the hook, one must then carefully align the tire so that, as it is lowered, the tire rim comes down exactly within the cradle of the hook. This sequence of movements is cumbersome and time consuming, especially for those of smaller stature such as young children. The process can be quite frustrating: if the tire is not aligned exactly, the tire will miss the hook when the bicycle frame is lowered. If so, the least of one's problems is that the sequence will have to be repeated. At worst, if one is not careful, and if the tire is not caught upon the hook as the bicycle is lowered, the tire and frame can slip out of one's grasp and fall to the ground. This is not only frustrating but could be injurious to any one attempting to place the bicycle for storage or anyone who happens to be nearby. The problem is especially worrisome whenever young bicycle riders or other children are involved.

Heffley also requires one wishing to store a bicycle to lift the entire bicycle vertically upward, because the bicycle must be mounted for storage by placing the crossbar of the bicycle into the vise-like grip positioned at the end of the locking arm extending from a base. But whereas Hoenig provides only a wall mountable device, the base of the Heffley device could be attached, say, to the ceiling of a structure as well as a wall. Like the Hoenig device, however, the Heffley device also requires a plurality of connections to secure the device to the structure.

U.S. Pat. No. 5,702,007, issued to Fritz et al., and titled Rack Especially Adapted For Use With Bicycles, describes an L-shaped rack mounted on a wall and having a centered arcuate well within which a bicycle tire can be supported. U.S. Pat. No. 5,292,009, issued to Smith and simply titled Bicycle Rack, also describes a rack—one which can be mounted to a wall or ceiling surface and which provides a right-angled channel to which a bicycle tire can be attached using separate clips, straps, or pins. U.S. Pat. No. 5,553,715 issued to Brotz and titled Bicycle Stand describes a stand embedded in the ground and having a vise-like gripper for holding the diagonal bar of a bicycle frame.

Like other conventional devices, though, these too provide little in the way of easy mounting of the bicycle to be stored. They are also difficult and cumbersome to install. Both the Smith-style mounting and pinning, as well as the bicycle holding and locking of Fritz et al. can be awkward and difficult, as well as time consuming. Both kinds of devices impose cumbersome constraints, in that each type requires one to hold a bicycle in place while fastening a lock or other fastening member to hold the bicycle from slipping out of position. Also, like a Heffley-type device, Brotz-type device utilizes vise-like grippers that, although, within easy reach, require positioning the crossbar of a bicycle within the saddle of the gripper. With both devices, the gripper cannot be threaded through the spokes of a bicycle to provide other storing positions, such as suspending the stored bicycle on one wheel; the Brotz-type device does not have enough lengthwise extension along the bottom clamp to hold a conventionally sized bicycle rim, whereas the Heffley-type device requires too much lateral extension to thread through the spokes of a conventional bicycle tire.

Additional problems with such conventional devices arise with respect to making, installing, and maintaining the devices. Conventional devices generally involve complex connections of multiple pieces. This increases the complexity and hence the cost of manufacturing such devices. It also adds to the burden of maintaining the devices because there are more pieces that can wear out and require replacement. Installation is also a problem with most of these conventional devices. All require the mounting of a frame to a surface or the encasement of a base in the ground. Multiple drilled holes in a support surface and screws for attaching the devices to the surface are required. This not only adds to the costs of manufacturing but also increases the time and effort necessary for one to install and use such devices. Moreover, conventional devices, such as those described above, are typically limited to storing one or, at most, two bicycles. Thus, as the number of bicycles to be stored increases, one is generally required to increase the number of devices used.

SUMMARY OF THE INVENTION

With the foregoing in mind, the present invention advantageously provides an apparatus and related methods for storing one or more bicycles by easily mounting a bicycle tire connected to a bicycle frame upon a suspension mount to thereby suspend the bicycle completely off a floor surface for storage. As described in detail below, a bicycle can be suspended for storage without having to laboriously and awkwardly align the bicycle over a hook or within a vise. Instead, the present invention provides for simply lifting a bicycle tire connected to a bicycle frame up to and over the end of a bicycle support extension extending from the mount, a major advantage being elimination of the labor and frustration associated with having to lift up the bicycle, align it within a vise-like grip or over a hook into which it is then lowered.

Specifically, the present invention provides a bicycle mount that can be suspended from the ceiling or a wall of a preexisting indoor or outdoor structure. A first end of the mount preferably forms a spirally threaded, screw-like elongate portion having either a pointed or flattened screw tip for attaching the mount to the structure. Extending outwardly from the mount at an opposing second end is an extension, defining a bicycle support extension, upon which a bicycle tire connected to a bicycle frame can be suspended. Preferably, the distal end of the extension is sufficiently open to easily thread through the spokes of a bicycle tire. The extension extends outwardly a sufficient distance to provide sufficient surface area exposure. The upper surface of the distal portion of the extension is preferably concave; beyond a specific point, moreover, preferably has a curvature everywhere increasing as one moves farther out along the distal end of the extension.

The extension therefore provides sufficient surface area with which to make contact with the rim without having to carefully align the tire before contacting the rim with the extension. The curvature of the surface along the distal portion of the extension is sufficient to prevent the tire from slipping off the extension regardless of the exact point at which the rim of the bicycle tire contacts with the extension. With the curvature increasing beyond a point along the distal end, the bicycle tire will be suspended securely regardless of where the rim first contacts the extension surface: the only sliding of the bicycle tire along the extension that can occur is if the tire slides into a more stable position closer to the closed proximal end of the extension.

Thus, to suspend a bicycle from the mount, one merely has to lift a tire of the bicycle up to and over the tip of the extension. The explicit curvature of the surface of the distal portion of the extension allows one to simply contact the rim of the tire with the upper surface of the extension. The curvature is sufficient to hold the tire on the extension regardless of where the rim of the tire of the bicycle being mounted on the suspension mount first contacts the extension.

More specifically, the bicycle support extension provides, then, just enough curvature to hold in place a bicycle tire while making it easy to thread the spokes of the tire through and the rim of the tire over the distal end of the extension. Thus, there is the advantage of easy mounting of a bicycle for storage in a room, a garage or beneath an overhang of some other structure.

As an elongated unitary piece, preferably, the suspension mount also can have a rigid first end formed to provide a spirally threaded, screw-like extension for easily connecting the elongate suspension mount to virtually any support structure, even one having only limited surface area exposure for connecting with the suspension mount.

The claimed invention provides other advantages as well. The elongate suspension formed as a unitary piece and having a spirally threaded rigid extension, for example, provides unique advantages in terms of theft deterrence when coupled with the addition of a lock-loop positioned on the elongate mount to receive a locking device. If, for example, a chain is threaded through the lock-loop and around the bicycle frame having a connected tire mounted on the arcuate end, the elongate suspension mount provides excellent theft deterrence: any attempt to disengage by unscrewing the spirally threaded proximal end from the support structure will inevitably cause the chain to wrap more tightly around the mount and bicycle frame. In this event, the only alternative for one attempting to steal a bicycle secured to the elongate suspension mount is to attempt to rotate the bicycle simultaneously while turning the spirally threaded proximal end—an awkward task that is not easily accomplished and that is unlikely to be successful in quick fashion for a would-be thief seeking to avoid detection.

As alluded to above, there also are advantages in terms of manufacturing and maintenance costs provided by the present invention as well. Specifically, as already noted, the surface-connecting spirally threaded fastener and extension defining a bicycle support extension with the above-described characteristics for easy mounting can be implemented as a relatively simple, yet eloquent and efficient unitary elongate suspension mount. Manufacturing is accordingly simple and hence less costly as compared to conventional devices that require multiple, intricately connected components. The corresponding lack of interrelated pieces with a simple yet eloquent elongate suspension mount eliminates the wear and tear on individual components and the concomitant need for multiple and frequent replacements.

A further advantage of such a design is that it is easy to install a unitary suspension mount. Having a spirally threaded screw-like proximal end, the elongate suspension mount can be installed about as easily as hanging a picture frame. The elongate suspension can be screwed into a surface portion of a ceiling by hand or with the assistance of a wrench. No more than the simple act of turning the threaded screw is required for positioning the mount to receive and support a bicycle tire and bicycle frame connected to the tire.

Yet a further advantage of the present invention is that it permits multiple bicycles or other lightweight two-wheeled vehicles to be suspended for storage using a single elongate suspension mount. The capability to store multiple bicycles requires only an equal number of arcuate ends extending from a distal end connected to a corresponding support structure. The same spiral threading on the proximal end accommodates the easy installation described above. The same theft deterrence as provided for a single bicycle is provided for each of multiple bicycles using the same lock-loop attached to the elongate mount as described above. The only increase in associated manufacturing costs for such a multiple-support mount are those associated with providing additional bicycle support extensions extending from the suspension mount. Otherwise, the same advantages described for a single mount pertain to one capable of storing multiple bicycles by suspending the tire and connected frame of each on a separate bicycle support extension.

The present invention further provides a method for securely storing a bicycle by suspending a bicycle tire and a bicycle frame connected to the tire. More specifically, the method includes fastening a suspension mount to a supporting structure, sliding the bicycle tire over an extension defining a bicycle support extension designed to thread readily through the spokes of a bicycle tire connected to a bicycle frame, and securing the bicycle frame to the mount by placing a locking device through a lock-loop positioned on the suspension mount.

In addition, the method further can include forming the bicycle support extension so as to have a curvature that is greater at any point nearer to the distal end of the support extension relative to the curvature at any other point nearer to the proximal end of the support extension such that the curvature is increasing at each point as one moves along the support extension away from the proximal end and toward the distal end. Providing this precise curvature provides a method of more easily storing the bicycle relative to conventional storing methods. Specifically, the curvature permits easier storing, since a bicycle tire connected to a bicycle frame need only be lifted up to the mount and the rim of the tire contacted with a portion of the curved surface of a suspension mount extension defining a bicycle support extension to thereby securely position the tire thereon and securely suspend the bicycle frame connected to the tire.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 1 is a side elevational view of an elongate suspension mount having a single arcuate extension defining a bicycle support extension and a medially positioned lock-loop according to a first embodiment of the present invention;

FIG. 2 is a front elevational view of an elongate suspension mount having a single arcuate extension defining a bicycle support extension and a medially positioned lock-loop according to a first embodiment of the present invention;

FIG. 3 is a top plan view of an elongate suspension mount having a single arcuate extension defining a bicycle support extension and a medially positioned lock-loop according to a first embodiment of the present invention;

FIG. 4 is a perspective environmental view of an elongate suspension mount connected to a structural beam according to a first embodiment of the present invention;

FIG. 5 is a perspective environmental view of an elongate suspension mount connected to a structural beam according to a first embodiment of the present invention;

FIG. 6 is a perspective environmental view of an elongate suspension mount connected to a structural beam according to a second embodiment of the present invention;

FIG. 7 is a perspective environmental view of an elongate suspension mount connected to a structural beam according to a second embodiment of the present invention;

FIG. 10 is a side elevational view of an elongate suspension mount having a single arcuate extension defining a bicycle support extension and a lock-loop positioned on the distal end of the support extension according to a fourth embodiment of the present invention;

FIG. 11 is a front elevational view of an elongate suspension mount having a single arcuate extension defining a bicycle support extension and a lock-loop positioned on the distal end of the support extension according to a fourth embodiment of the present invention;

FIG. 12 is a side elevational view of an elongate suspension mount having a single arcuate end and a lock-loop positioned on the support extension medially between the proximal and the distal ends of the support extension according to a fifth embodiment of the present invention;

FIG. 13 is a front elevational view of an elongate suspension mount having a single arcuate extension defining a bicycle support extension and a lock-loop positioned on the support extension medially between the proximal and the distal ends of the support extension according to a fifth embodiment of the present invention;

FIG. 14 is a side elevational view of an elongate suspension mount having a single arcuate extension defining a bicycle support extension and a lock-loop positioned adjacent thereto according to a sixth embodiment of the present invention;

FIG. 15 is a top plan view of an elongate suspension mount having a single arcuate extension defining a bicycle support extension and a lock-loop positioned adjacent thereto according to a sixth embodiment of the present invention;

FIG. 16 is a side elevational view of an elongate suspension mount having a single arcuate extension defining a bicycle support extension and a lock-loop positioned on the distal end of the support extension according to a seventh embodiment of the present invention;

FIG. 17 is a front elevational view of an elongate suspension mount having a single arcuate extension defining a bicycle support extension and a lock-loop positioned on the distal end of the support extension according to a seventh embodiment of the present invention;

FIG. 18 is a side elevational view of an elongate suspension mount having dual arcuate extensions, each defining a bicycle support extension, and dual medially positioned lock-loops according to an eighth embodiment of the present invention;

FIG. 19 is a top plan view of an elongate suspension mount having dual arcuate extensions, each defining a bicycle support extension, with dual medially positioned lock-loops according to an eighth embodiment of the present invention;

FIG. 20 is a side elevational view of an elongate suspension mount having dual arcuate ends with a lock-loop positioned adjacent thereto according to a ninth embodiment of the present invention;

FIG. 21 is a top plan view of an elongate suspension mount having dual arcuate extensions, each defining a bicycle support extension, and a lock-loop positioned adjacent thereto according to a ninth embodiment of the present invention;

FIG. 24 is a side elevational view of the proximal end of an elongate suspension mount forming a spirally threaded screw and having a medially positioned hexagon nut for connecting the elongate suspension mount to a support structure according to an eleventh embodiment of the present invention;

FIG. 25 is a side elevational view of an elongate suspension mount having an arcuate extension defining a bicycle support extension upon which a bicycle tire is mounted with the rim contacting the extension according the present invention;

FIG. 26 is a side elevational view of an upper portion of a distal portion of a bicycle support extension having a positive curvature according to the present invention;

DETAILED DESCRIPTION OF PREFERRED EMBODIMENTS

Figure 8:
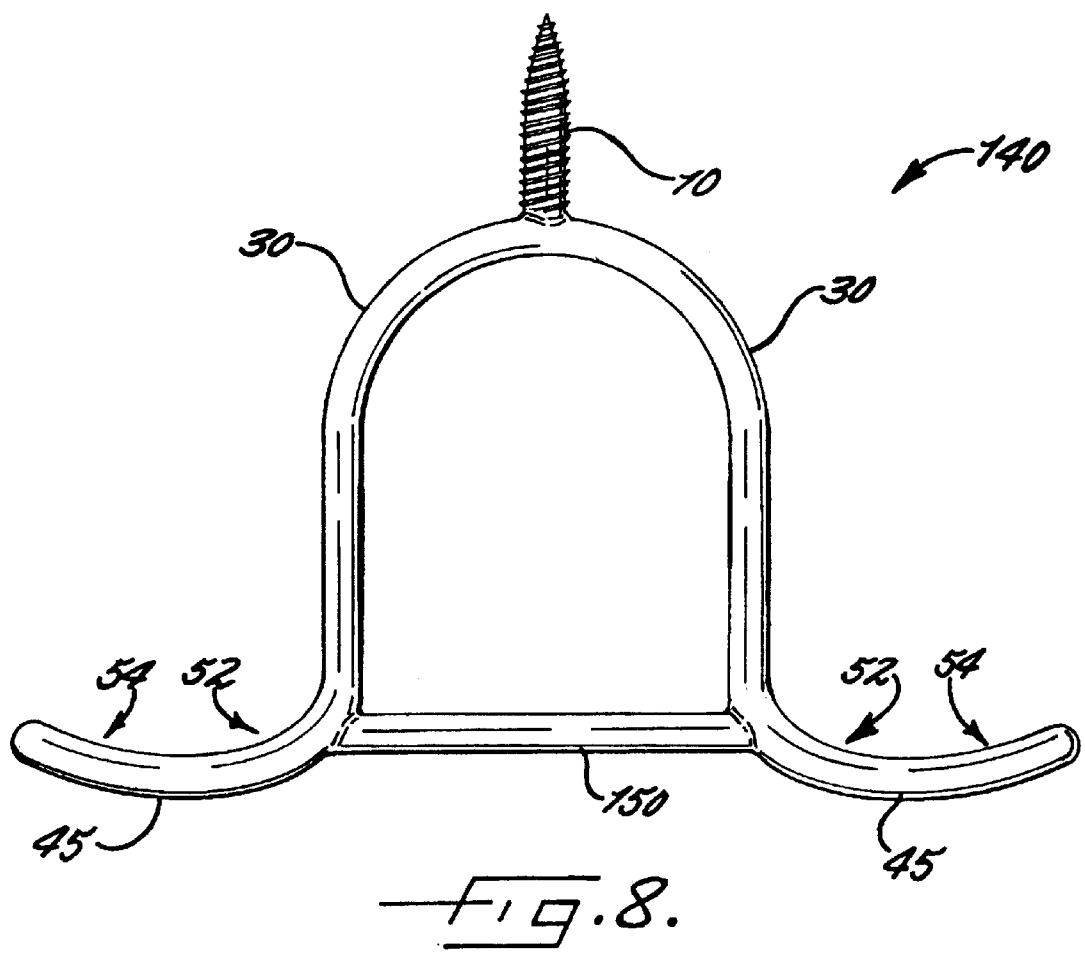
FIG. 8 is a side elevational view of an elongate suspension mount having dual arcuate extensions, each defining a bicycle support extension, and centrally positioned lock-loop according to a third embodiment of the present invention.

The present invention will now be described more fully hereinafter with reference to the accompanying drawings which illustrate preferred embodiments of the invention. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, the prime notation, if used, indicates similar elements in alternative embodiments.

FIGS. 1–24 illustrate various embodiments of an apparatus for securely storing a bicycle or comparable two-wheeled vehicle by suspending a tire 26 and vehicle frame connected to the tire 26 from a suspension mount 20, 80, 140, 200, 260, 320, 380, 440, 500, 560, 620, 700 that is fastened to a mount support surface 19 of a preexisting structure. The suspension mount 20, 80, 140, 200, 260, 320, 380, 440, 500, 560, 620, 700 preferably includes a fastener 10, 70 for fastening the suspension mount to a separate support structure 19, at least one lock loop 30, 90, 150, 210, 270, 320, 380, 450, 510, 570 for receiving a lockable chain, chord, bar or other locking device for locking the bicycle to the mount, and at least one extension 45, defining a bicycle support extension. The suspension mount 20, 80, 140, 200, 260, 320, 380, 440, 500, 560, 620, 700 is composed of a metal, plastic, alloy, or combination of comparable materials as will be readily understood by those skilled in the art so that the suspension mount 20, 80, 140, 200, 260, 320, 380, 440, 500, 560, 620, 700 is strong enough to support the combined weight of at least one bicycle tire 26—preferably both tires—and the bicycle frame connected thereto, the suspension mount itself being connected to a wall, ceiling, or other structure.

Figure 29:
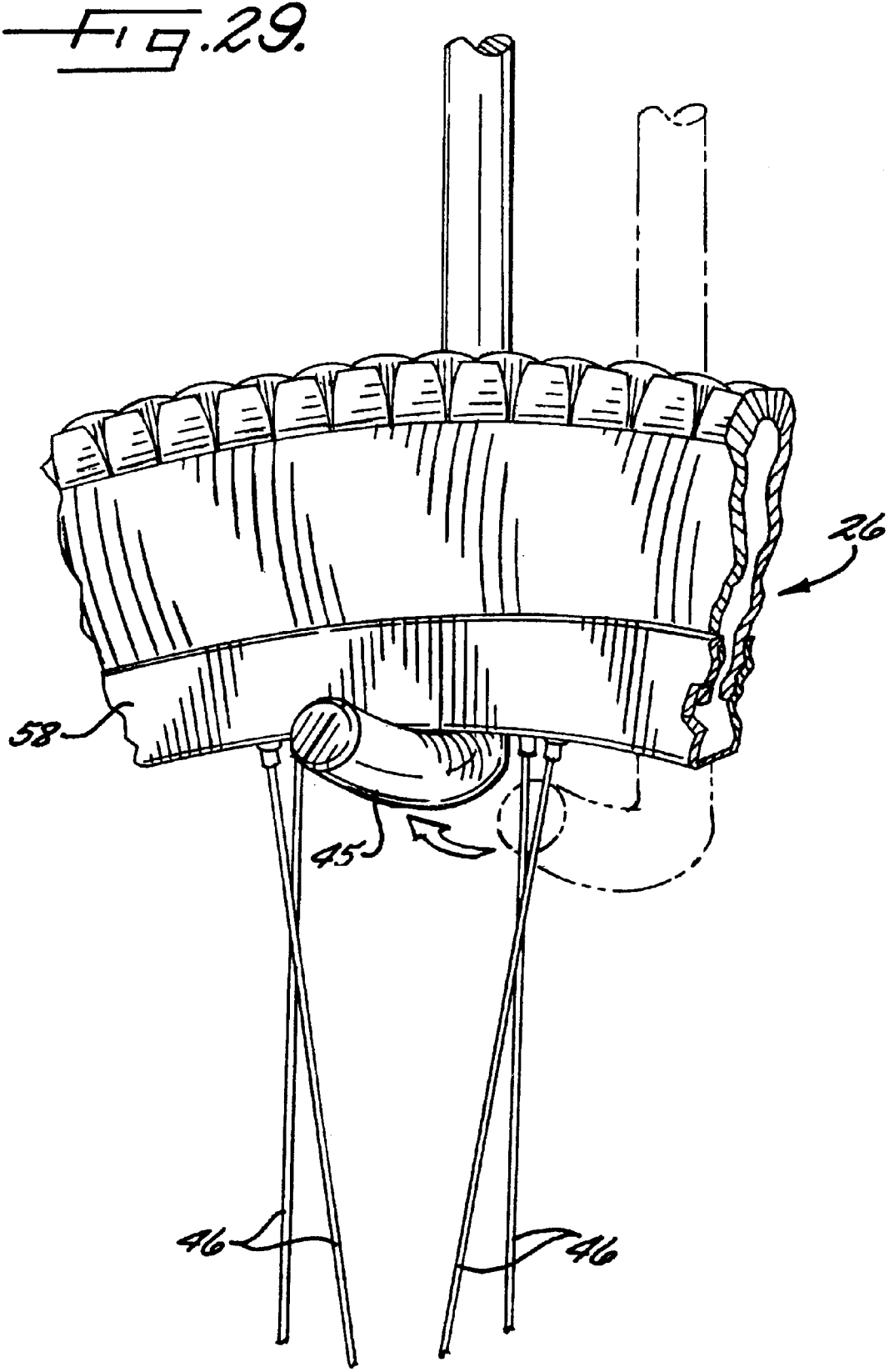
FIG. 29 is a front perspective view of an elongate bicycle support extension threaded through the spokes of a bicycle tire according to the present invention.

In order to mount a bicycle or similar lightweight two-wheeled vehicle easily upon the suspension mount 20, 80, 140, 200, 260, 320, 380, 440, 500, 560, 620, 700, the width or lateral extent of the extension defining a bicycle support extension 45 is sufficiently narrow so as to readily pass through the open space between the spokes 46 extending from a hub to the rim 58 of a conventional bicycle tire 26 (See FIG. 29). Preferably, the extension defining a bicycle support extension 45 is substantially elongate, as perhaps most vividly illustrated in FIGS. 1, 4, 5, 8, 10, 12, 14, 16, 18, 20 and 22. The present invention can accommodate other configurations as well. As explained in detail below, however, a key aspect of the present invention remains the extent and curvature of the upper surface along a distal portion 54 of the bicycle support extension 45.

The extension defining a bicycle support extension 45 preferably provides a distal projection of sufficient extent as to provide enough exposed upper surface area along the extension defining a bicycle support extension 45 so that one merely has to lift a tire 26 connected to a bicycle frame over the distal tip of the extension 45 in order to easily contact the rim 58 of the tire 26 with the upper surface of the extension 45. Preferably, the proximal surface portion 52 and particularly the distal surface portion 54 of the extension 45 are curved as explicitly illustrated in FIGS. 1, 4, 5, 8, 10, 12, 14, 16, 18, 20 and 22. Moreover, as explained in more detail below, the curvature of a portion of the upper surface 54 of the distal portion of the extension 45 is preferably increasing at each point as one moves farther along the distal end of the extension defining a bicycle support extension 45.

The extension defining a bicycle support extension 45, therefore, provides sufficient upper surface area with which to contact the rim 58 of the bicycle tire 26 without having to carefully align the tire 26 before bringing the rim 58 into contact with an upper surface portion of the extension defining a bicycle support extension 45. The curvature of the distal surface portion 54 along the distal portion of the extension 45 is sufficient to prevent the tire from slipping off the extension regardless of the exact point at which the rim makes contact with the extension.

More specifically, the upper surface of the distal portion 54 of the extension defining a bicycle support extension 45 has a curvature, K, greater than zero beyond some point as one moves out along the distal end portion of the extension defining a bicycle support extension 45, the curvature being the rate of change of the angle made by the tangent line with respect to the arc length and given formally by the following formula wherein it is assumed that the extension extends distally in the positive direction, x (see FIG. 26): $K = du/ds = (du/dx)/(ds/dx)$; where, for any curve given by the equation $y = f(x)$, $u = \tan^{-1}[f'(x)]$ is the angle that a line tangent to the curve at a point on the concave side of the curve makes with x axis, and $ds = [dx^2 + dy^2]^{1/2}$ is the differential of arc (see, e.g., Eugene A. Avallone & Theodore Baumeister III, MARK'S STANDARD HANDBOOK FOR MECHANICAL ENGINEERS, 10$^{th}$ ed. (1996), 2–26; John M. H. Olmsted, ADVANCED CALCULUS (1961), 252–254).

Figure 27:
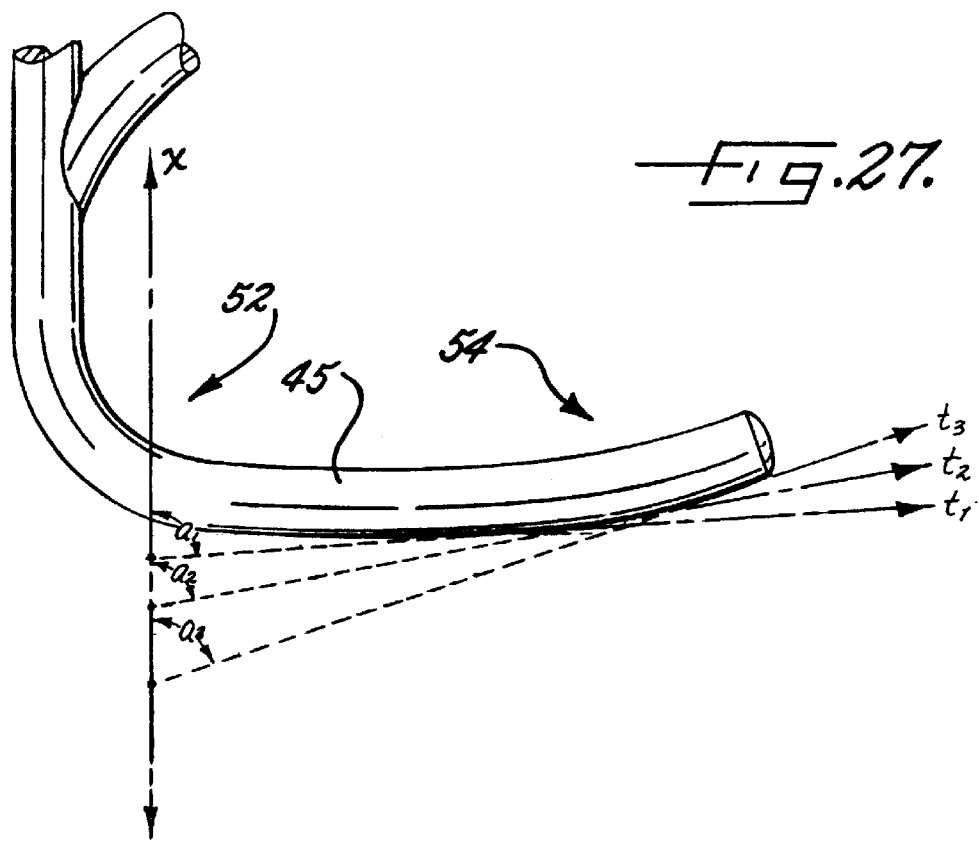
FIG. 27 is a side elevational view of an elongate bicycle support extension having an upwardly sloping distal portion according to the present invention.
Figure 28:
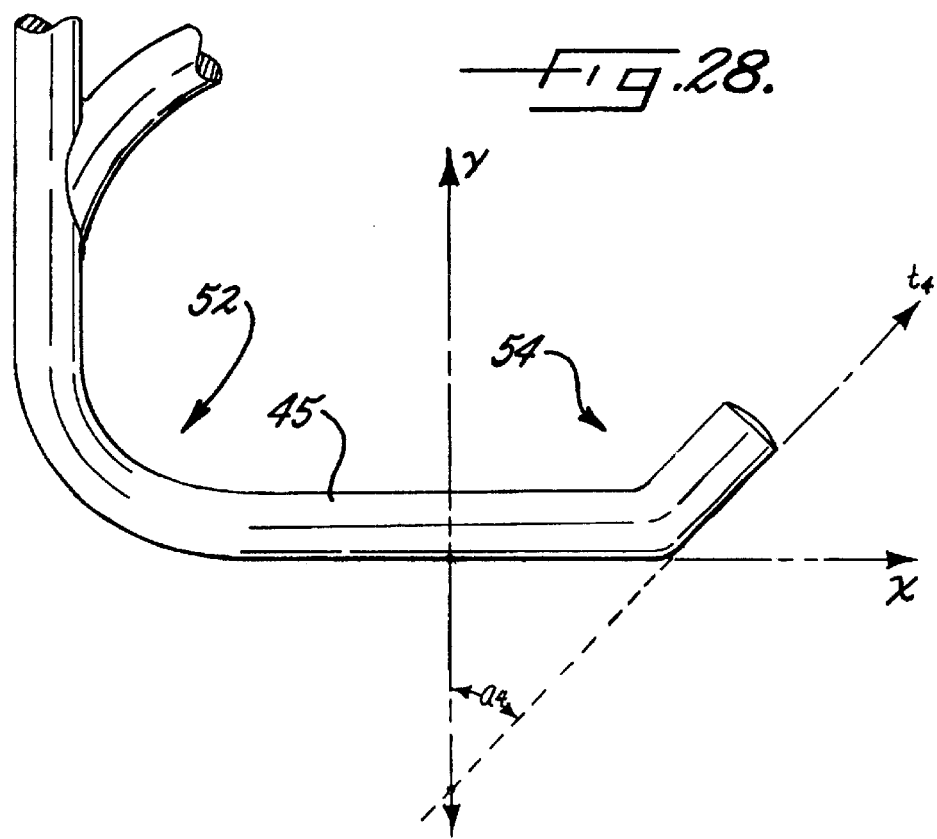
FIG. 28 is a side elevational view of an elongate bicycle support extension having an upwardly sloping distal portion with zero curvature according to the present invention.

Preferably, then, the curvature K of the bicycle support extension 45 is, beyond some point along the distal end, greater at any point nearer to the distal end of the support extension relative to the curvature at any other point nearer to the proximal end of the support extension such that the curvature is increasing at each point as one moves along the distal end of the support extension 45 away from the proximal end (see FIGS. 26–28.) This geometry ensures that a bicycle tire can be readily mounted on the extension by simply sliding it onto the extension without having to position it over the extension for proper placement. As the curvature of the distal surface portion 54 along the distal portion of the extension defining a bicycle support extension 45 preferably is increasing at each point beyond a predetermined point along the distal portion, the bicycle tire will be suspended securely regardless of where the rim 58 of the bicycle tire 26 first contacts the upper surface the extension defining a bicycle support extension 45: the only sliding of the tire 26 and rim 58 along the upper surface of the extension 45 that can occur (depending on friction) is if the tire rim 58 slides into a more stable position within the concave region.

Thus, to suspend a bicycle from the mount, one merely has to lift a tire of the bicycle up to and onto the extension defining a bicycle support extension 45. The explicit curvature of the surface of at least the upper distal portion 54 of the distal portion of the extension 45 allows one simply to contact the rim 58 of the tire 26 with the upper surface portion of the extension defining a bicycle support extension 45. The curvature is sufficient to hold the tire on the extension regardless of where the rim 58 of the tire 26 of the bicycle being mounted on the suspension mount 30 20, 80, 140, 200, 260, 320, 380, 440, 500, 560, 620, 700 first contacts the extension 45. This, then, ensures that a bicycle tire 26 and bicycle frame connected to the tire 26 can easily be mounted on the suspension mount 20, 80, 140, 200, 260, 320, 380, 440, 500, 560, 620, 700 by simply lifting the tire 26 and sliding it onto the extension 45 without any need for aligning the tire over a hook or positioning it within a loop as with conventional devices.

Preferably, the suspension mount 20, 80, 140, 200, 260, 320, 380, 440, 500, 560, 620, 700 is integrally formed to provide a unitary device. Forming the suspension mount 20, 80, 140, 200, 260, 320, 380, 440, 500, 560, 620, 700 as a unitary piece provides a number of distinct advantages, including those having to do with manufacturing efficiencies and related to theft deterrence. Firstly, forming the suspension mount 20, 80, 140, 200, 260, 320, 380, 440, 500, 560, 620, 700 as a unitary piece eliminates having to have separate-piece processing and reduces the attendant costs of manufacturing multiple pieces and having to connect them to form a single suspension apparatus. A first end of the unitary suspension mount 20, 80, 140, 200, 260, 320, 380, 440, 500, 560, 620, 700, moreover, preferably is an integrally formed, spirally threaded extension forming a screw-like projection portion. For example, as illustrated in FIGS. 4 and 5, the fastener 10 defines a first end of the suspension mount 20 and comprises a rigid, point-tipped extension that can be screwed into a support structure 99 so as to connect the suspension mount 20 to the mount support surface 19. Alternatively, the fastener 70 defines a first end of a suspension mount 80 and comprises a rigid flat-tipped extension that secures in bolt-like fashion with the support structure 99 to thereby connect the suspension mount 80 to the mount support surface 19. Thus, the first end, as described, defines a fastener 10,70 for easily fastening the mount 20, 80, 140, 200, 260, 320, 380, 440, 500, 560, 620, 700 to a preexisting structure 19. Other types of fasteners defining a first end of the suspension mount 20, 80, 140, 200, 260, 320, 380, 440, 500, 560, 620, 700, being integrally formed with or rigidly connected to the suspension mount 20, 80, 140, 200, 260, 320, 380, 440, 500, 560, 620, 700 and extending therefrom will be readily apparent to those skilled in the art.

In addition, the suspension mount 20, 80, 140, 200, 260, 320, 380, 440, 500, 560, 620, 700 preferably includes a lock-loop 30, 90, 150, 210, 270, 320, 380, 450, 510, 570 positioned thereon for receiving a locking devices such as a dual-ended chain or flexible, heavy-duty chord or rigid bar lock, that can be threaded through the lock-loop and around the bicycle frame to lock the bicycle frame to the suspension mount 20, 80, 140, 200, 260, 320, 380, 440, 500, 560, 620, 700. A significant advantage of a unitary suspension mount 20, 80, 140, 200, 260, 320, 380, 440, 500, 560, 620, 700 is found in its combination with such an integrally formed or otherwise securely connected lock-loop 30, 90, 150, 210, 270, 320, 380, 450, 510, 570. Such a device is difficult to disconnect from the separate structure 99 to which the unitary suspension mount 20, 80, 140, 200, 260, 320, 380, 440, 500, 560, 620, 700 is attached whenever a bicycle is suspended thereupon and the bicycle frame is secured to the mount 20, 80, 140, 200, 260, 320, 380, 440, 500, 560, 620, 700 with a locking device attached to the lock-loop 30, 90, 150, 210, 270, 320, 380, 450, 510, 570. If a would-be bicycle thief attempts to unscrew an integrally formed or rigidly connected spirally threaded fastener 10, 70 under such condition, then the bicycle must be turned simultaneously in unison with the turning of the fastener 10, 70—a feat not easily accomplished, especially for the would-be thief seeking to abscond with the bicycle before being detected. Otherwise the securing chain or chord will simply wrap tighter around the bicycle frame making the bicycle all the more difficult to separate from the suspension mount 20, 80, 140, 200, 260, 320, 380, 440, 500, 560, 620, 700.

FIGS. 1–3 illustrate a first embodiment of a unitary suspension mount 20 having an integrally formed spirally threaded extension defining a first end 10 for fastening the mount to a mount support surface 19 and an opposing second end having an extension 45 extending outwardly therefrom. Connected with the fastener 10 defining a first end of the unitary suspension mount 20 is an elongate body portion 35, rigidly extending from the first end and extending substantially vertically and being substantially perpendicular to the mount support surface 19 (see FIGS. 4 and 5). Beneath the mount support surface 19 is a horizontally extending floor surface to which the overlying mount support surface extends substantially parallel.

An extension 45, preferably elongated, extends outwardly from the elongate body portion 35, the extension defining a bicycle support extension 45 that has a proximal end integrally connected with and extending outwardly from a lower end portion of the elongate body portion 35. The bicycle support extension 45 preferably extends outwardly a distance sufficiently greater than the lateral extent of the rim of a large sized bicycle tire so as to generally provide ample surface area on the extension 45 to easily contact with the rim 58 of a bicycle tire 26 being mounted thereon. Thus, the distal extent provides sufficient distance to readily receive the bicycle tire 26 connected to the bicycle frame of the bicycle without having to precisely align the tire 26 over the extension when mounting the bicycle tire 26 thereon. The lateral extent of the bicycle support extension 45, however, is sufficiently narrow so as to readily thread through spokes 46 of the bicycle.

A distal portion of the bicycle support extension 45 has an outer lower surface extending upwardly such that the acute angle $a_i$ between an imaginary line tangent $t_i$ to the lower surface at any point thereon and an imaginary line y substantially parallel to the lengthwise extent of the elongate body portion is greater than about five (5) degrees and less than about ninety (90) degrees (see FIGS. 27 and 28). Preferably, to make for easy lifting of the tire over the distal tip of the extension 45, the angle will be at least forty five (45) degrees so that the distal end does not rise more than is minimally necessary to hold the bicycle tire in place.

When the bicycle support extension is essentially elongate as illustrated, the lower surface and upper surface roughly coincide, but more generally, the present invention provides ease of mounting regardless of whether the bicycle tire extension 45 is elongated, provided that the upper surface portion of the distal extent of the extension 45 has a certain curvature. Preferably, then, the curvature everywhere along the upper surface of the distal portion 54 of the extension is greater than or equal to zero and at every point thereon is greater than or equal to the curvature at any other point located farther from the distal end of the extension 45, the curvature being defined as the ratio of the differential of arc to the angle of a line tangent to the convex side of the surface. This curvature facilitates the easy mounting of a bicycle tire 26 on the extension 45 wherein the rim 58 of the tire is easily brought into contact with the upper surface 54 of the distal portion of the bicycle support extension 45 (see FIG. 25).

Preferably, moreover, the curvature of the upper surface 54 of the distal portion of the extension 45 is such that at every point thereon the curvature is greater at that point than the curvature at every other point farther away from the distal end such that the curvature is increasing at each point along the upper surface of the distal portion 54 of the support extension 45 as one moves closer to the proximal end thereof. This, again, ensures that regardless of where the rim 58 of the tire 26 initially contacts the upper surface of the extension 45, sliding of the tire 26 along the extension results only in the bicycle coming to rest at a more stable position. The present invention, thus, contrasts sharply with conventional devices using hooks and vise-grips. A hook requires one to lift and hold the tire up over a hook and align the rim before bringing the tire down. A vise-grip requires that one lift the bicycle frame or tire precisely into the confines of the vise-like gripper, align the frame or tire for proper balance within the ripper, and, while holding the frame or tire in place, lose the fingers or clamps of the vise. No such efforts are required for securing a bicycle tire and frame for storage using the present invention.

As further illustrated in FIGS. 1–3, the unitary suspension mount 20 includes below the first end of the mount a closed loop 30 defining a lock-loop for receiving a locking device to secure the frame of a bicycle having a tire mounted on the bicycle support extension 45 to the suspension mount 20. As illustrated in FIGS. 1–3, the lock loop 30 is positioned medially on the suspension mount between the first end and a second end at which the proximal end of the bicycle support extension 45 is connected to the elongate body portion 35.

As described in applicant's copending application titled Apparatus and Method for Preventing Theft of a Bicycle while Providing Convenient Storing of Same, Ser. No. 09/677,252, filed Oct. 2, 2000, certain theft deterrence benefits are obtained by positioning the lock-loop 30 sufficiently above the extension defining a bicycle support extension 45 so as to make it difficult for a would-be thief to attack a lock-secured chain or chord threaded through the lock-loop and wrapped around a suspended bicycle frame, while still maintaining its position within reach from a floor surface so to not make it too difficult for one leisurely mounting a bicycle for storage to reach. Thus, if T represents the length of a straight-line distance parallel to the length of the suspension mount 20 and d the straight-line distance parallel to the length of the suspension mount 20 extending from the center of the lock-loop 30 to the axial apex of the extension 45 of the unitary suspension mount 20 the optimal placement of the loop-lock is such that the distance d relative to T will be approximately (¼)T, or greater, but no more than approximately (½)T. Thus, this positioning of the lock-loop 30 achieves an optimal trade-off between theft deterrence and ease of placement of a bicycle tire upon a suspension mount 20.

Positioning the lock-loop nearer to or on the extension defining a bicycle support extension 45, however, provides more ready access to the lock-loop. Thus, FIGS. 10 and 11 illustrate a fourth embodiment of a unitary suspension mount 200 having a lock-loop 210 positioned on an outward tip of the distal end of the elongate extension defining a bicycle support extension 45 and extending from the second end of the suspension mount 200 for receiving a locking device to lock the bicycle frame to the mount. The positioning of the lock-loop 210 thereby provides easy access for locking a bicycle frame to the suspension mount 200.

Similarly, FIGS. 16 and 17 illustrate a seventh embodiment of a unitary suspension mount 380, one having the lock-loop 390 positioned on the underside of distal tip of the extension defining a bicycle support extension 45, so as also to provide for easy locking and unlocking of locking device. In yet a fifth embodiment, illustrated in FIGS. 12 and 13, the lock loop 270 on the suspension mount 260 is positioned medially on the underside of the extension defining a bicycle support extension 45 between the proximal and distal ends thereof. And still further, FIGS. 14 and 15 illustrate a sixth embodiment of a suspension mount 320 having a single lock-loop 330 positioned between the first and second ends of the suspension mount 320 and adjacent the extension defining a bicycle support extension 45. Again, each of the respective embodiments provide differing levels of access and accordingly different degrees of theft deterrence, but nonetheless are each intended to accommodate the specific needs of the user.

Figure 9:
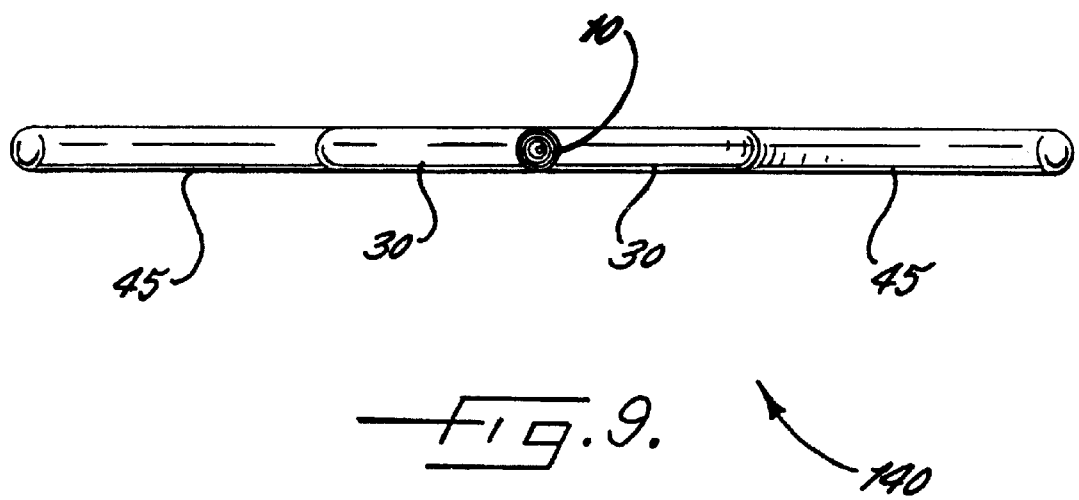
FIG. 9 is a top plan view of an elongate suspension mount having dual arcuate extensions, each defining a bicycle support extension, and centrally positioned lock-loop according to a third embodiment of the present invention.
Figure 22:
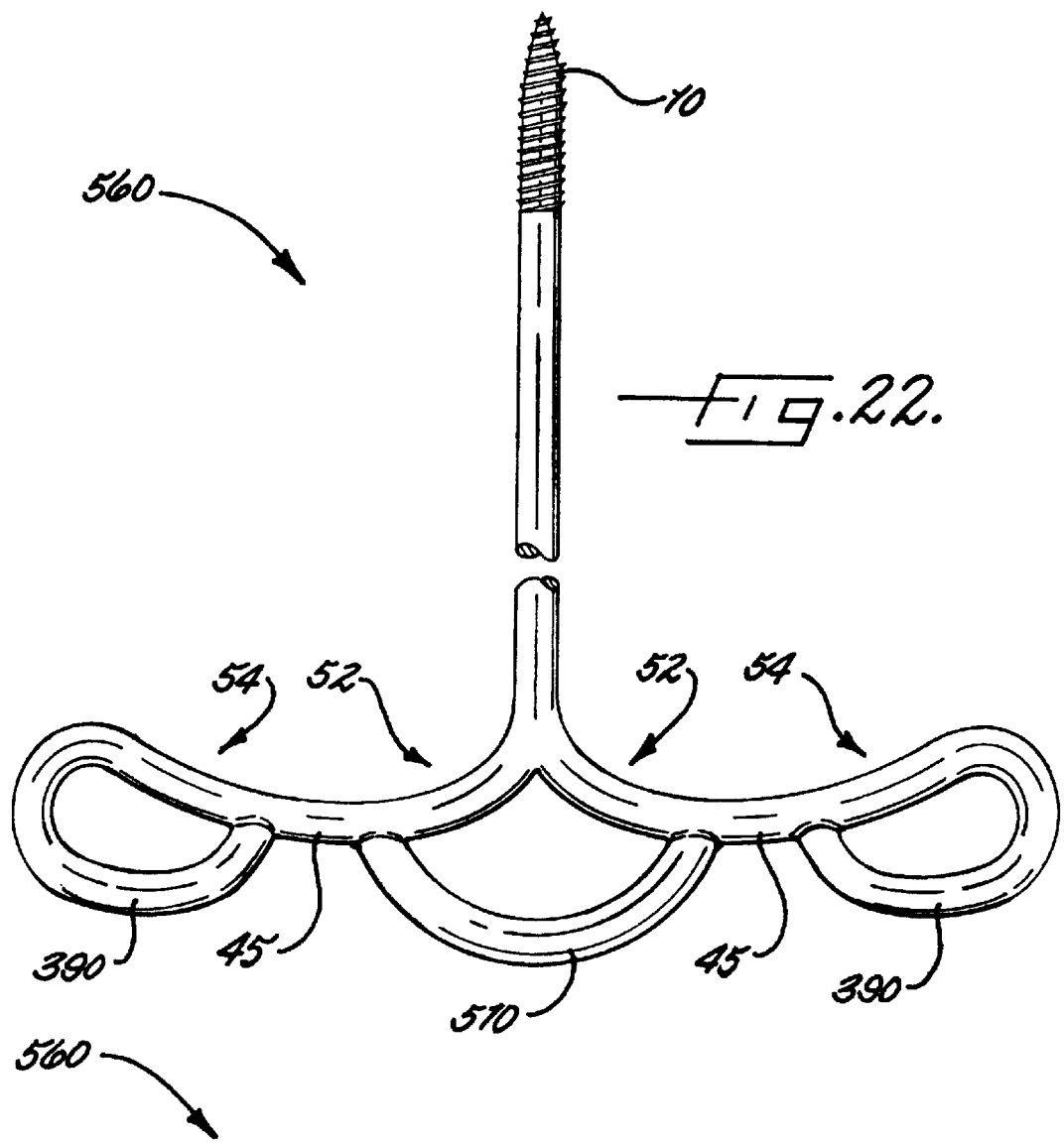
FIG. 22 is a side elevational view of an elongate suspension mount having first and second arcuate extensions, each defining a bicycle support extension, a first lock loop positioned on the distal end of the first support extension, a second lock loop positioned on the second support extension, and a third lock-loop positioned between the first and second support extensions according to a tenth embodiment of the present invention.
Figure 23:
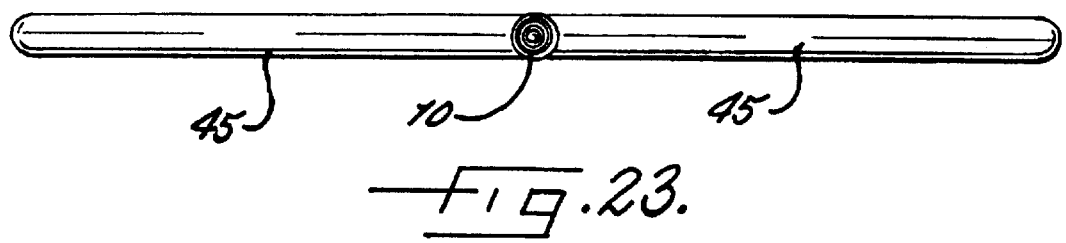
FIG. 23 is a top plan view of an elongate suspension mount having first and second arcuate extensions, each defining a bicycle support extension, a first lock loop positioned on the distal end of the first support extension, a second lock loop positioned on the second support extension, and a third lock-loop positioned between the first and second support extensions according to a tenth embodiment of the present invention.

The same advantages in terms of easy placement and theft deterrence achieved with the present invention pertain regardless of the number of support extensions extending from the suspension mount 20, 80, 140, 200, 260, 320, 380, 440, 500, 560, 620, 700. FIGS. 8, 9 and 18–23 each illustrate, respectively, embodiments of the present invention having two extensions defining bicycle support extensions 45. Specifically, FIGS. 8 and 9 illustrate a third embodiment of the present invention in which the suspension mount 140 comprises a centered lock-loop 150, a spirally threaded fastener 10, and two distinct extensions, each defining a bicycle support extension 45.

FIGS. 18 and 19, illustrate a eighth embodiment of the suspension mount 440 having two distinct extensions each defining a bicycle support extension 45, but wherein two lock-loops 450 are positioned medially between the first and second ends of the suspension mount 440. An ninth embodiment is illustrated in FIGS. 20 and 21 wherein the lock loop 510 is positioned on the underside of the suspension mount 500 medially between two opposing extensions, each defining a bicycle support extension 45. A tenth embodiment is illustrated in FIGS. 22 and 23, wherein, again, two extensions defining a bicycle support extension 45 are included along with three lock-loops—two lock-loops 390 positioned on the underside of the distal ends of the extensions and a third 510 positioned medially between the extension.

Figure 30:
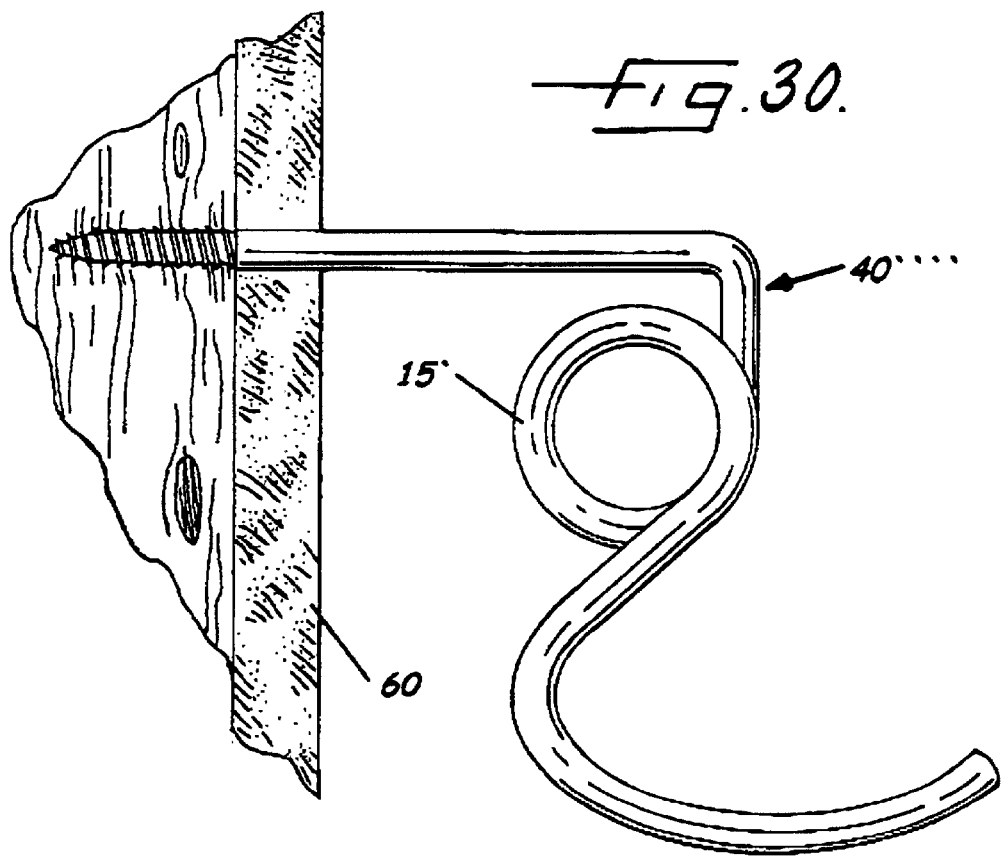
FIG. 30 is a side elevational view of an elongate suspension mount suspended from a wall of a structure and having a closed loop extending toward the wall according to the present invention.
Figure 31:
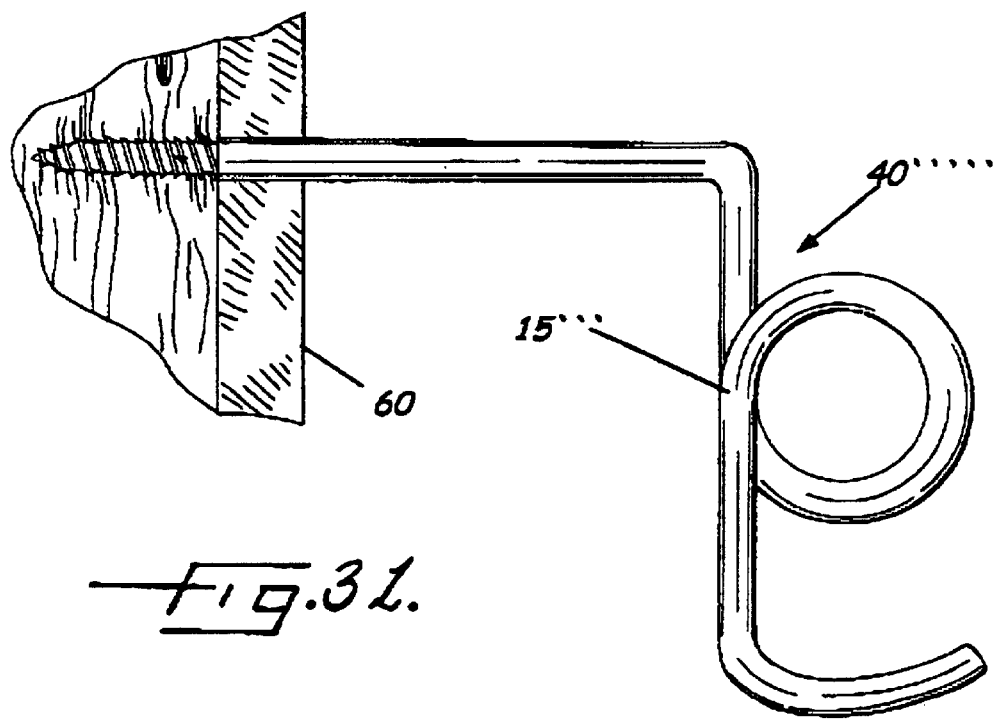
FIG. 31 is a side elevational view of an elongate suspension mount suspended from a wall of a structure and having a closed loop extending away from the wall according to the present invention.

Moreover, as illustrated in FIGS. 30–31, with the mount fastened to a wall, the substantially closed loop 15' can extend toward the wall or away from the wall, as well as lie above or lie below the axial length of the elongate suspended mount.

Although the suspension mounts 140, 440, 500, 560 are illustrated as having only two distinct extensions defining bicycle support extensions 45, it will be apparent that a suspension mount having additional support extensions is possible, the only constraint being the ability to space them sufficiently to accommodate the anticipated sizes of the multiple bicycles to be stored.

FIGS. 1–26 also illustrate the method aspects of the present invention. Specifically, the present invention provides a method for securely storing a bicycle by suspending a bicycle tire and a bicycle frame connected to the tire. More specifically, the method includes fastening a unitary suspension mount to a supporting structure, sliding the bicycle tire over an arcuate end of the suspension mount, which is arcuate and upwardly curved so as to thread readily through the spokes of a bicycle tire connected to a bicycle frame, and securing the bicycle frame to the mount by placing a locking device through a lock-loop positioned on the suspension mount for receiving a locking device to lock the bicycle frame to the mount.

The method for securely storing a bicycle, according to the present invention, can include suspending a bicycle tire connected to a bicycle frame upon a bicycle support extension fastened to a support structure and for receiving and suspending thereon the bicycle tire connected to a bicycle frame, wherein the support extension forms a curved extension extending outwardly with a connected, closed proximal end and an open distal end, the curvature of the upper surface of which is beyond some point along the distal portion everywhere increasing as one moves out along the distal portion to thereby permit a bicycle tire readily to be mounted on the extension by simply sliding it over the distal end of the extension without having to position it over the extension for proper placement, and securing the bicycle frame to a lock-loop fastened positioned to receive a locking device for locking the bicycle to the lock-loop.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That claimed is:

1. A unitary suspension mount for positioning a bicycle tire thereon when the bicycle tire is connected to a bicycle frame of a bicycle so that the suspension mount supportingly suspends the bicycle off a horizontally extending floor surface, the suspension mount comprising:

a fastener positioned to define a first end of the suspension mount to fasten the suspension mount to a mount support surface so that the mount support surface supports the suspension mount and a bicycle suspended on the suspension mount;

an elongate body portion integrally formed with and rigidly extending from the first end, extending substantially vertically and being substantially perpendicular to the mount support surface and the horizontally extending floor surface when the mount support surface extends substantially parallel to and overlies the horizontally extending floor support surface;

at least one elongated bicycle support extension rigidly and integrally connected to a lower end portion of the elongate body portion and extending outwardly therefrom a sufficient distance to readily receive the bicycle tire connected to the bicycle frame of the bicycle, the at least one bicycle support extension also having a lateral extent being sufficiently narrow to readily thread through spokes of the bicycle tire to thereby suspend the bicycle therefrom and a distal portion having an outer lower surface extending upwardly such that an acute angle between an imaginary line tangent to the lower surface at any point thereon and an imaginary line substantially parallel to the lengthwise extent of the elongate body portion is between about five (5) degrees and about ninety (90) degrees; and at least one fixedly closed loop positioned away from the first end, the closed loop defining a lock-loop for the suspension mount through which a locking device is readily positionable for further securing the bicycle when mounted thereon.

2. A unitary suspension mount as defined in claim 1 wherein the fastener is a single unitary extension.

3. A unitary suspension mount as defined in claim 2 wherein the single unitary extension is spirally threaded to provide a substantially rigid screw-like extension for connecting the suspension mount to the mount support surface.

4. A unitary suspension mount as defined in claim 1 wherein the elongate body portion has a substantially uniform width throughout.

5. A unitary suspension mount as defined in claim 1 wherein the acute angle between an imaginary line tangent to the lower surface of the distal portion of the at least one bicycle support extension at any point thereon and an imaginary line substantially parallel to the lengthwise extent of the elongate body portion is between about forty five (45) degrees and about ninety (90) degrees.

6. A unitary suspension mount as defined in claim 1 wherein said at least one lock-loop is positioned medially on the suspension mount between the first end and an opposing lower end of the suspension mount for receiving a locking device to lock the bicycle frame to the mount.

7. A unitary suspension mount as defined in claim 1 wherein said at least one lock-loop for receiving a locking device to lock the bicycle frame to the mount is positioned on the suspension mount adjacent said at least one bicycle support extension extending from a lower end portion of the suspension mount.

8. A unitary suspension mount as defined in claim 1 wherein said at least one lock-loop is positioned on said at least one bicycle support extension extending from a lower end portion of the suspension mount for receiving a locking device to lock the bicycle frame to the mount.

9. A unitary suspension mount as defined in claim 1 wherein an upper surface portion of the distal portion of said at least one extension is such that, as with respect to any two distinct points along the surface portion, the curvature of the surface at a point closer to a distal end of the extension is greater than the curvature at a point farther from the distal end of the extension.

10. A bicycle suspension mount for positioning a bicycle tire thereon when the bicycle tire is connected to a bicycle frame of a bicycle so that the suspension mount supportingly suspends the bicycle off a horizontally extending floor surface, the suspension mount comprising:

a fastener positioned to define a first end of the suspension mount to fasten the suspension mount to a mount support surface so that the mount support surface supports the suspension mount and a bicycle suspended on the suspension mount;

an extension, defining a bicycle support extension, extending outwardly from an opposing second end of the mount to receive and suspend thereon the bicycle, the support extension having a proximal end connected to the opposing second end and a distal portion including an upper surface portion thereof having a curvature everywhere along the upper surface greater than or equal to zero and wherein the curvature at every point thereon is greater than or equal to the curvature at any other point located farther from the distal end of the extension in a direction inwardly toward the proximal end to thereby permit a bicycle tire to be readily mounted on the extension by contacting a rim of the tire with the upper surface of the extension without having to further align the bicycle tire or frame above or over the extension for proper placement, the distal portion further having an outer lower surface extending upwardly such that an acute angle between an imaginary line tangent to the lower surface at any point thereon and an imaginary line substantially parallel to the lengthwise extent of the elongate body portion is between about five (5) degrees and about ninety (90) degrees; and at least one fixedly closed lock-loop associated with and integrally connected to a portion of the suspension mount positioned at a lower elevation than the first end to thereby define a closed lock-loop for the suspension mount through which a locking device is readily positionable for further securing the bicycle when mounted thereon.

11. A bicycle suspension mount as defined in claim 10 wherein the curvature of the upper surface portion of the distal portion of the bicycle support extension is greater than the curvature at every other point thereon that is farther from the distal end of the extension in a direction inwardly toward the proximal end such that the curvature is increasing at each point along the upper surface portion of the distal portion of the support extension as one moves closer to the distal end thereof.

12. A suspension mount as defined in claim 11 wherein the fastener is a single unitary extension defining a first end of the suspension mount.

13. A suspension mount as defined in claim 12 wherein the single unitary portion is spirally threaded to provide a substantially rigid screw-like extension for connecting the suspension mount to the mount support surface.

14. A suspension mount as defined in claim 11 wherein said at least one lock-loop is positioned medially on the suspension mount between the first end and an opposing lower end of the suspension mount for receiving a locking device to lock the bicycle frame to the mount.

15. A suspension mount as defined in claim 11 wherein said lock-loop for receiving a locking device to lock the bicycle frame to the mount is positioned on the suspension mount adjacent said bicycle support extension extending from a lower end portion of the suspension mount.

16. A suspension mount as defined in claim 11 wherein said lock-loop is positioned on an said bicycle support extension extending from a lower end portion of the suspension mount for receiving a locking device to lock the bicycle frame to the mount.

17. A unitary suspension mount for positioning a bicycle tire thereon when the bicycle tire is connected to a bicycle frame of a bicycle so that the suspension mount supportingly suspends the bicycle off a horizontally extending floor surface, the suspension mount comprising:

a fastener positioned to define a first end of the suspension mount to fasten the suspension mount to a mount support surface so that the mount support surface supports the suspension mount and a bicycle suspended on the suspension mount;

an elongate body portion integrally formed with and rigidly extending from the first end, extending substantially vertically and being substantially parallel to the mount support surface and perpendicular to the horizontally extending floor surface when the mount support surface extends substantially perpendicular to the horizontally extending floor support surface;

at least one elongated bicycle support extension rigidly and integrally connected to a lower end portion of the elongate body portion and extending outwardly therefrom a sufficient distance to readily receive the bicycle tire connected to the bicycle frame of the bicycle, the at least one bicycle support extension also having a lateral extent being sufficiently narrow to readily thread through spokes of the bicycle tire to thereby suspend the bicycle therefrom and a distal portion having an outer lower surface extending upwardly such that the acute angle between an imaginary line tangent to the lower surface at any point thereon and an imaginary line substantially parallel to the lengthwise extent of the elongate body portion is between about five (5) degrees and about ninety (90) degrees; and at least one fixedly closed loop positioned away from the first end, the closed loop defining a lock-loop for the suspension mount through which a locking device is readily positionable for further securing the bicycle when mounted thereon.

18. A unitary suspension mount as defined in claim 17 wherein the fastener is a single unitary extension.

19. A unitary suspension mount as defined in claim 18 wherein the single unitary extension is spirally threaded to provide a substantially rigid screw-like extension for connecting the suspension mount to the mount support surface.

20. A unitary suspension mount as defined in claim 17 wherein the elongate body portion has a substantially uniform width throughout.

21. A unitary suspension mount as defined in claim 17 wherein the acute angle between an imaginary line tangent to the lower surface of the distal portion of the at least one bicycle support extension at any point thereon and an imaginary line substantially parallel to the lengthwise extent of the elongate body portion is between about forty five (45) degrees and about ninety (90) degrees.

22. A unitary suspension mount as defined in claim 17 wherein said lock-loop is positioned medially on the suspension mount between the first end and an opposing lower end of the suspension.

23. A unitary suspension mount as defined in claim 17 wherein said at least one lock-loop for receiving a locking device to lock the bicycle frame to the mount is positioned on the suspension mount adjacent said at least one bicycle support extension extending from a lower end portion of the suspension mount.

24. A unitary suspension mount as defined in claim 17 wherein said at least one lock-loop is positioned on said at least one bicycle support extension extending from a lower end portion of the suspension mount for receiving a locking device to lock the bicycle frame to the mount.

25. A unitary suspension mount as defined in claim 17 wherein the curvature of the upper surface of the distal portion of the at least one extension is such that, as with respect to any two distinct points along the surface portion, the curvature of the surface at a point closer to a distal end of the extension portion is greater than the curvature at a point farther from the distal end of the extension.

26. A bicycle suspension mount for positioning a bicycle tire thereon when the bicycle tire is connected to a bicycle frame of a bicycle so that the suspension mount supportingly suspends the bicycle off a horizontally extending floor surface, the suspension mount comprising:

a fastener positioned to define a first end of the suspension mount to fasten the suspension mount to a mount support surface so that the mount support surface supports the suspension mount and a bicycle suspended on the suspension mount;

a main body portion rigidly connected to the first end and extending substantially perpendicularly to the horizontally extending floor surface when the mount support surface is positioned above the horizontally extending floor support surface;

at least one elongated bicycle support extension rigidly and integrally connected to a lower end portion of the main body portion and extending outwardly therefrom a sufficient distance to readily receive the bicycle tire connected to the bicycle frame of the bicycle, the at least one bicycle support extension also having a lateral extent being sufficiently narrow to readily thread through spokes of the bicycle tire to thereby suspend the bicycle therefrom and a distal portion having an outer lower surface extending upwardly such that an acute angle between an imaginary line tangent to the lower surface at any point thereon and an imaginary line substantially parallel to the lengthwise extent of the elongate body portion is between about five (5) degrees and about ninety (90) degrees; and at least one fixedly closed lock-loop associated with and integrally connected to a portion of the suspension mount positioned at a lower elevation than the first end to thereby define a closed lock-loop for the suspension mount through which a locking device is ready positionable for further securing the bicycle when mounted thereon.

27. A unitary suspension mount as defined in claim 26 wherein the acute angle between an imaginary line tangent to the lower surface of the distal portion of the at least one bicycle support extension at any point thereon and an imaginary line substantially parallel to the lengthwise extent of the main body portion is between about forty five (45) degrees and about ninety (90) degrees.

28. A bicycle suspension mount as defined in claim 26 wherein said at least one lock-loop is positioned medially on the suspension mount between the first end and an opposing lower end of the suspension mount for receiving a locking device to lock the bicycle frame to the mount.

29. A bicycle suspension mount as defined in claim 26 wherein said at least one lock-loop for receiving a locking device to lock the bicycle frame to the mount is positioned on the suspension mount adjacent said at least one bicycle support extension extending from a lower end portion of the suspension mount.

30. A bicycle suspension mount as defined in claim 26 wherein said at least one lock-loop is positioned on said at least one bicycle support extension extending from a lower end portion of the suspension mount for receiving a locking device to lock the bicycle frame to the mount.

31. A bicycle suspension mount as defined in claim 26 wherein the curvature of the upper surface of the distal portion of the at least one extension is such that, as with respect to any two distinct points along the surface portion, the curvature of the surface at a point closer to a distal end of the extension portion is greater than the curvature at a point farther from the distal end of the extension.

32. A bicycle suspension mount as defined in claim 26 wherein the single unitary portion is spirally threaded to provide a substantially rigid screw-like extension for connecting the suspension mount to the mount support surface.

33. A method of securely storing a bicycle by suspending off a horizontally extending floor surface a bicycle tire and a bicycle frame connected to the tire, the method comprising the steps:

fastening a suspension mount to a preselected support structure, a suspension mount including at least one elongated bicycle support extension associated with a lower portion of the suspension mount and extending outwardly therefrom a sufficient distance to readily receive a bicycle tire connected to the bicycle frame of the bicycle, the at least one bicycle support extension also having a lateral extent being sufficiently narrow to readily thread through spokes of the bicycle tire to thereby suspend the bicycle therefrom and a distal portion having an outer lower surface extending upwardly such that an acute angle between an imaginary line tangent to the lower surface at any point thereon and an imaginary line substantially parallel to the lengthwise extent of the elongate body portion is between about five (5) degrees and about ninety (90) degrees; and lifting the bicycle tire over the distal end of a bicycle support extension extending outwardly from the suspension mount and contacting a rim of the bicycle tire with an upper surface portion of the extension, the upper surface being sufficiently concave to prevent the bicycle tire from disengaging and to permit the bicycle tire to position on the extension in a stable position regardless of where along the upper surface the rim initially contacts with the extension.

34. A method for securely storing a bicycle as defined in claim 33 further comprising the step of securing the bicycle frame to the suspension mount by placing a locking device through a closed lock-loop positioned on the suspension mount for receiving a locking device to lock the bicycle frame to the mount.

* * * * *